United States Patent
Onishi et al.

(10) Patent No.: US 8,009,255 B2
(45) Date of Patent: Aug. 30, 2011

(54) DISPLAY PANEL COMPRISING A MARK LOCATED OUTSIDE OF A SEALANT AND A FLATTENING FILM INCLUDING A SEALING EXPOSING PORTION

(75) Inventors: Noriaki Onishi, Nara (JP); Yohsuke Fujikawa, Tokyo (JP); Hiroaki Tomioka, Matsusaka (JP); Hiroaki Kojima, Kashiba (JP); Yasunobu Tagusa, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/753,130

(22) Filed: Apr. 2, 2010

(65) Prior Publication Data
US 2010/0188631 A1 Jul. 29, 2010

Related U.S. Application Data

(62) Division of application No. 12/064,114, filed as application No. PCT/JP2006/318166 on Sep. 13, 2006, now Pat. No. 7,907,246.

(30) Foreign Application Priority Data

Sep. 15, 2005 (JP) ................................. 2005-268899

(51) Int. Cl.
*G02F 1/1333* (2006.01)
*G02F 1/1339* (2006.01)

(52) U.S. Cl. ........................................ 349/138; 349/153
(58) Field of Classification Search .................. 349/153, 349/138, 43; 361/679.01
See application file for complete search history.

(56) References Cited

U.S. PATENT DOCUMENTS

| | | | |
|---|---|---|---|
| 5,936,695 A * | 8/1999 | Hida et al. | ..... 349/153 |
| 6,078,367 A | 6/2000 | Satou | |
| 6,229,586 B1 | 5/2001 | Date et al. | |
| 6,750,938 B2 | 6/2004 | Koyama | |
| 2001/0012079 A1 | 8/2001 | Yamamoto et al. | |
| 2005/0146666 A1 | 7/2005 | Hatta | |
| 2009/0046235 A1 * | 2/2009 | Onishi et al. | ..... 349/153 |

FOREIGN PATENT DOCUMENTS

| | | |
|---|---|---|
| JP | 63-180932 A | 7/1988 |
| JP | 4-60517 A | 2/1992 |
| JP | 09-258670 A | 10/1997 |
| JP | 11-142825 A | 5/1999 |

(Continued)

OTHER PUBLICATIONS

Official communication issued in the International Application No. PCT/JP2006/318166, mailed on Dec. 12, 2006.
Onishi et al. "Display Panel", U.S. Appl. No. 12/064,114, filed on Feb. 19, 2008.
Official communication issued in counterpart Japanese Application No. 2007-535512, mailed on Sep. 24, 2008.

(Continued)

*Primary Examiner* — Thoi Duong
(74) *Attorney, Agent, or Firm* — Keating & Bennett, LLP (57) ABSTRACT

A liquid crystal display panel includes an active matrix substrate, a counter substrate, a liquid crystal layer, and a sealant. The counter electrode is opposed to the active matrix substrate. The liquid crystal layer is provided between the active matrix substrate and the counter substrate. The sealant, which surrounds the liquid crystal layer between the active matrix substrate and the counter substrate, joins the active matrix substrate and the counter substrate and seals the liquid crystal layer. A portion of the surface on the liquid crystal layer side of the active matrix substrate which is located at the periphery of the liquid crystal display panel is flat.

14 Claims, 11 Drawing Sheets

FOREIGN PATENT DOCUMENTS

| | | |
|---|---|---|
| JP | 2000-231086 A | 8/2000 |
| JP | 2001-337334 A | 12/2001 |
| JP | 2002-043703 A | 2/2002 |
| JP | 2002-174819 A | 6/2002 |
| JP | 2002-182185 A | 6/2002 |
| JP | 2002-297048 A | 10/2002 |
| JP | 2003-222904 A | 8/2003 |
| JP | 2004-212690 A | 7/2004 |
| JP | 2005-283885 A | 10/2005 |

OTHER PUBLICATIONS

Onishi et al. "Display Panel", U.S. Appl. No. 12/064,114, filed on Oct. 25, 2010.

Onishi et al. "Display Panel", U.S. Appl. No. 12/911,164, filed on Oct. 25, 2010.

Onishi et al. "Display Panel", U.S. Appl. No. 12/911,169, filed on Oct. 25, 2010.

* cited by examiner

DISPLAY PANEL COMPRISING A MARK LOCATED OUTSIDE OF A SEALANT AND A FLATTENING FILM INCLUDING A SEALING EXPOSING PORTION

BACKGROUND OF THE INVENTION

1. Summary of the Invention

The present invention relates to a display panel.

2. Description of the Related Art

A flat display panel typified by a liquid crystal display panel includes a pair of substrates of which peripheral portions are joined to each other by means of a sealant and a display medium layer (for example, a liquid crystal layer) introduced in a cell formed by the pair of substrates and the sealant. For manufacturing such a flat display panel, especially, for manufacturing a flat display panel comparatively small in size, a method is employed, with a view to achieving high production efficiency, in which a plurality of cells (constitutional units) are formed on a large-size mother glass substrate; scribe lines for individually dividing the plurality of cells thus formed are formed; then the cells (constitutional units) are divided individually along the scribe lines (see Japanese Unexamined Patent Application Publication No. 2003-222904 and Japanese Unexamined Patent Application Publication No. 2004-212690, for example).

In the conventional scribing method as disclosed in Japanese Unexamined Patent Application Publication No. 2003-222904 and Japanese Unexamined Patent Application Publication No. 2004-212690, however, chips and cracks may be formed in the glass substrate which lowers the efficiency percentage. In other words, the conventional flat display panel involves insufficient manufacturing efficiency (efficiency percentage). Particularly, recent progress in thinning the flat display panel accompanies thinning of the glass substrates used, and therefore, a flat display panel using such thin glass substrates (glass substrates having a thickness of 0.5 mm or smaller or 0.4 mm or smaller, for example) makes the above problem more significant.

SUMMARY OF THE INVENTION

In order to overcome the problems described above, preferred embodiments of the present invention provide a display panel that is capable of being manufactured with high production efficiency.

A display panel in accordance with a preferred embodiment of the present invention includes: a first substrate; a second substrate opposed to the first substrate; a display medium layer provided between the first substrate and the second substrate; an a sealant surrounding the display medium layer between the first substrate and the second substrate to join the first substrate and the second substrate and sealing the display medium layer. In the display panel in accordance with the present preferred embodiment of the present invention, a portion of a surface on a display medium layer side of the first substrate which is located at a periphery of the display panel is flat. It is preferable that each portion of the surfaces (the surface on the display medium layer side and the surface on the opposite side of the display medium layer side) of the first substrate which is located at the periphery of the display panel is flat. More preferably, these surfaces are flat and smooth.

The first substrate may include a first substrate body and a flattening film covering at least an entirety of the portion of the surface on the display medium layer side of the first substrate body which is located at the periphery of the display panel. The flattening film may be a resin film. In the present specification, the term "resin film" means a film containing organic resin or silicon resin. Further, the term "display medium layer" means a layer of which light transmittance or light reflectance is modified by potential difference between electrodes opposed to each other or a layer spontaneously emitting light by current flowing between the electrodes opposed to each other. Specifically, the display medium layer includes, for example, liquid crystal layers, inorganic or organic electroluminescent layers, light emitting gas layers, electrophoretic layers, electrochromic layers, and the like. Accordingly, the display panel in accordance with the present preferred embodiment of the present invention may be a liquid crystal display panel, an inorganic or organic electroluminescent display panel, or the like.

Moreover, the term "flat" in the present specification means flat to such an extent that the micro variation amount of a surface is about 0.3 µm or smaller, for example. The micro variation amount of a surface can be measured by a probe type surface profiling device, P-15 manufactured by KLA-Tencor Corporation.

The first substrate may be an active matrix substrate. Specifically, the first substrate further may include: a plurality of thin film transistors formed on the first substrate body; an interlayer insulating film which is formed on the plurality of thin film transistors and in which a plurality of through holes open to the plurality of thin film transistors are formed; and a plurality of pixel electrodes which are formed on the interlayer insulating film and which are electrically connected to the thin film transistors through the plurality of through holes. In this case, the interlayer insulating film is preferably formed as the flattening film on the entirety of the portion of the first substrate body which is located at the periphery of the display panel.

In the display panel in accordance with a preferred embodiment of the present invention, preferably, a portion of a surface on a display medium layer side of the second substrate which is located at the periphery of the display panel is flat. Preferably, each portion of both the surfaces (the surface on the display medium layer side and the surface on the opposite side of the display medium layer side) of the second substrate which is located at the periphery of the display panel is flat. More preferably, these surfaces are flat and smooth.

A display panel in accordance with another preferred embodiment of the present invention includes: a first substrate in which a plurality of conductive members are provided; a second substrate opposed to the first substrate; a display medium layer provided between the first substrate and the second substrate; and a sealant surrounding the display medium layer between the first substrate and the second substrate to join the first substrate and the second substrate and sealing the display medium layer. In the second display panel in accordance with the present preferred embodiment of the present invention, at least one scribe mark is formed on a portion of the first substrate which is located at a periphery of the display panel, the scribe mark being formed of the same film as a film forming the thinnest conductive member of all the plurality of conductive members. In the present specification, the term "conductive member" means a member presenting a conductivity of about $10^6$ S/m or larger in the steady state. The conductivity may be measured by a four-terminal method or the like.

In the display panel in accordance with the present preferred embodiment of the present invention, the first substrate may be an active matrix substrate. Specifically, the first substrate may include: a plurality of gate lines extending in parallel to each other; a plurality of source lines extending in parallel to each other with an angle formed relative to a direction that the plurality of gate lines extend; switching elements connected to both the gate lines and the source lines; an interlayer insulating film which is formed on the switching elements and in which a plurality of through holes open to the switching elements are formed; and a plurality of pixel electrodes electrically connected to the switching elements through the plurality of interlayer insulating films. In this case, the plurality of conductive members include the plurality of gate lines, the plurality of source lines, and the plurality of pixel electrodes. One or more scribe marks may be formed of the same film as a film forming the thinnest conductive member out of the plurality of gate lines, the plurality of source lines, and the plurality of pixel electrodes.

The plurality of pixel electrodes may be substantially made of conductive oxide while the at least one scribe mark may preferably be formed of the same film as a film forming the plurality of pixel electrodes. The conductive oxide includes indium thin oxide (ITO), indium zinc oxide (IZO), tin oxide (SnO), and the like, for example.

The at least one scribe mark may be substantially made of metal. For example, the at least one scribe mark may be formed of the same film as a film forming the electrode line.

Preferably, the at least one scribe mark may be separated from an edge of the first substrate.

The at least one scribe mark may be in a polygonal form in plan view having a side agreeing with an edge of the first substrate in plan view. In this case, preferably, the at least one scribe mark includes at least one edge in perpendicular contact with an edge of the first substrate in plan view.

The at least one scribe mark may be substantially made of conductive oxide.

These and other features, elements, steps, advantages, and characteristics of the present invention will be apparent from the following description of preferred embodiments with reference to the accompanying drawings.

BRIEF DESCRIPTION OF THE DRAWINGS

FIGS. 4A and 4B are enlarged views showing a portion encircled in IV in FIG. 1, and specifically.

DETAILED DESCRIPTION OF THE PREFERRED EMBODIMENTS

Preferred embodiments of the present invention will be described below in detail with reference to the accompanying drawings.

First Preferred Embodiment

FIG. 1 to FIG. 4 show a liquid crystal display panel 1 in accordance with the present preferred embodiment.

The liquid crystal display panel 1 in accordance with the present preferred embodiment preferably includes: an active matrix substrate 10 as a first substrate; a counter substrate 30 as a second substrate: and a liquid crystal layer 20 as a display medium layer provided between the active matrix substrate 10 and the counter substrate 30. The counter electrode 30 is not shown in FIG. 4B for the sake of explanation.

Between the active matrix substrate 10 and the counter substrate 30, a sealant 40 is provided so as to surround the liquid crystal layer 20. The sealant 40 joins the active matrix substrate 10 and the counter substrate 30 and seals the liquid crystal layer 20.

Figure 1:
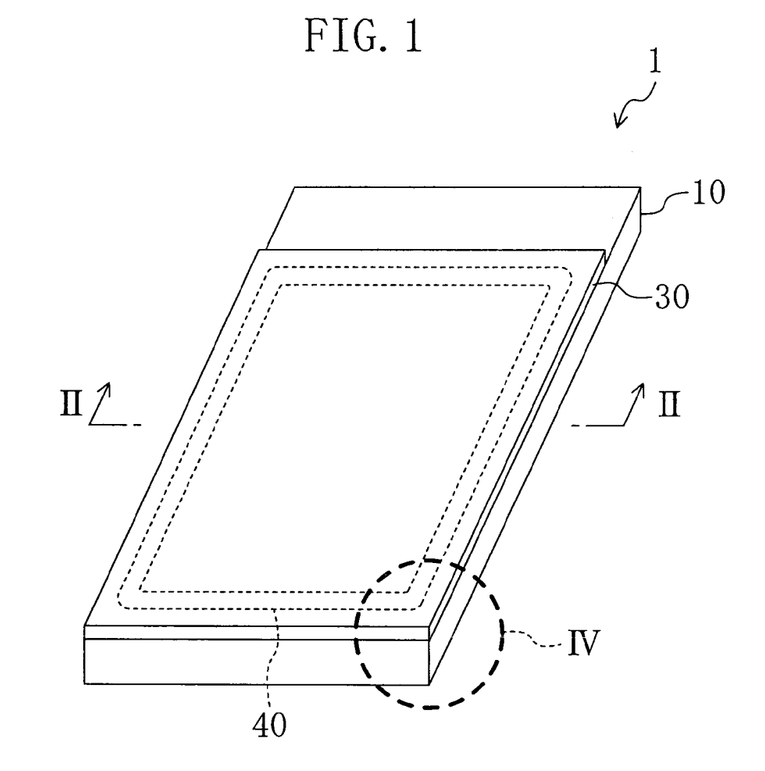
FIG. 1 is a perspective view of a liquid crystal display panel in accordance with a preferred embodiment of the present invention.
Figure 2:
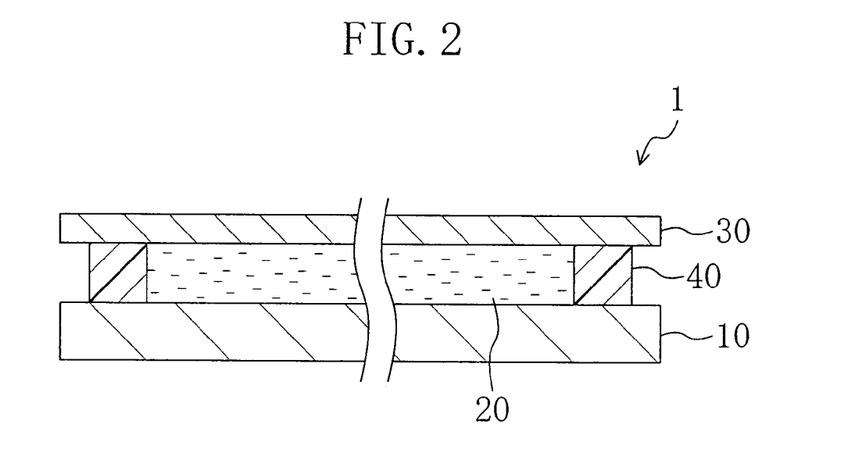
FIG. 2 is a schematic sectional view of a portion taken along the line II-II in FIG. 1.
Figure 3:
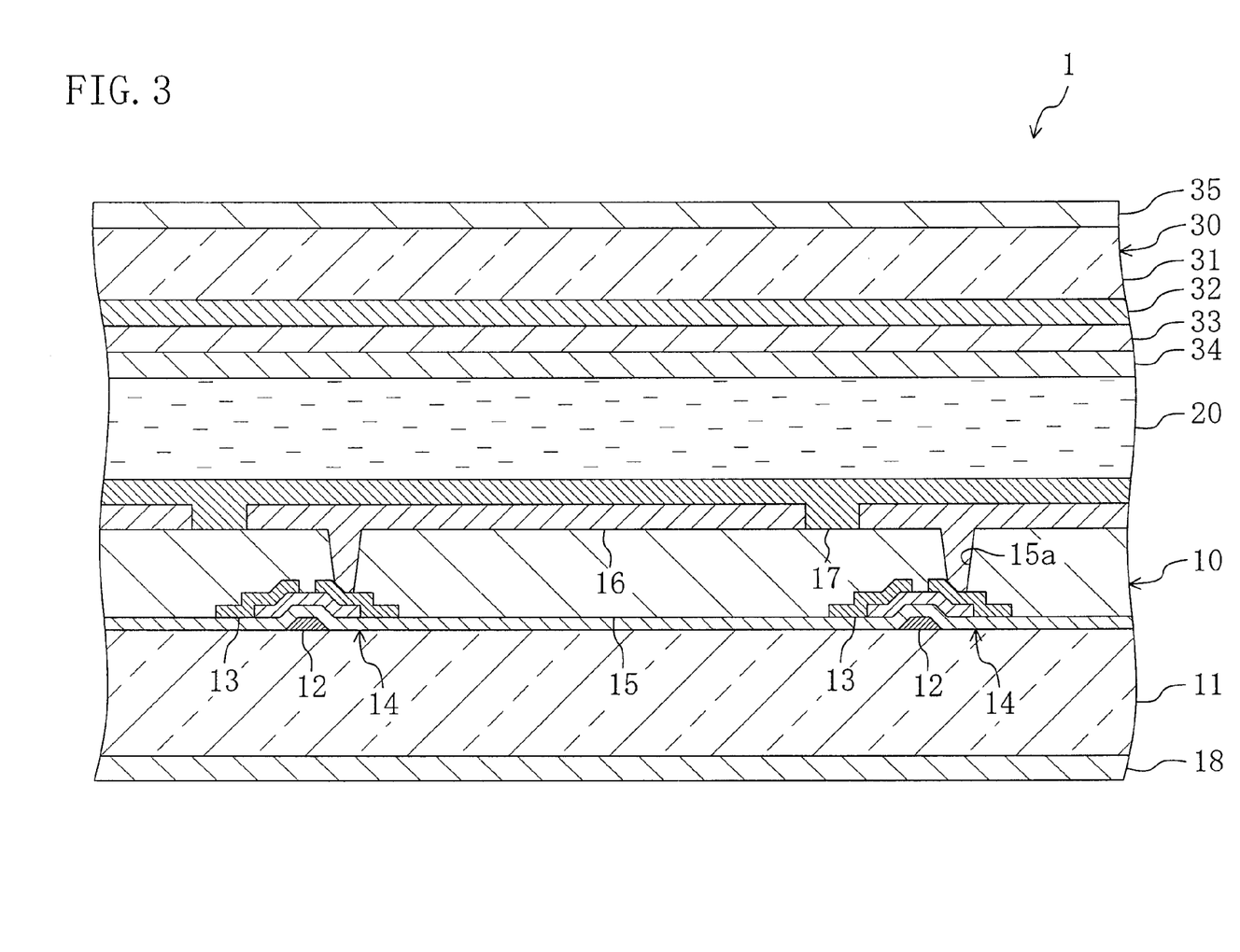
FIG. 3 is a partial sectional view of the liquid crystal display panel.

As shown in FIG. 3, the active matrix substrate 10 includes: a first substrate body 11 made of glass, for example; a plurality of gate lines 12 extending in parallel to each other; a plurality of source lines 13 extending in parallel to each other; a plurality of thin film transistor elements (hereinafter, they may be referred to as "TFT elements") 14; an interlayer insulating film 15; a plurality of pixel electrodes 16 substantially made of transparent conductive oxide (indium tin oxide, indium zinc oxide, or the like, for example); scribe marks 50 in a trapezoidal form in plan view formed in the peripheral portion of the first substrate body 11 separately from the edges of the first substrate body 11; a first rubbing film (an alignment film) 17; and a first polarizing plate 18 provided on the surface opposite to the surface on the liquid crystal layer 20 side of the first substrate body 11.

The plurality of gate lines 12 are formed on the first substrate body 11. The plurality of source lines 13 are formed across the gate lines 12 so as to extend in parallel to each other in a direction intersecting with the gate lines 12 (typically, intersecting at a right angle). The gate lines 12 and the source lines 13 are preferably made of metal, such as tungsten (W), tantalum (Ta), or the like. An insulating film (a silicon oxide film, a silicon nitride film, or the like, for example) is formed between the gate lines 12 and the source lines 13 for insulating them from each other.

The TFT elements 14 as switching elements, which are electrically connected to both the gate lines 12 and the source lines 13, are provided in the vicinity of the intersections of the plurality of gate lines 12 and the plurality of source lines 13. The interlayer insulating film 15, which is preferably made of organic resin (resin of which main component is epoxy acrylate resin, urethane acrylate resin, o-diazonaphthoquinone novolac based resin, or the like), is formed on the plurality of TFT elements 14. The resin used for the interlayer insulating film 15 preferably has high light transmittance, low dielectric constant, large resistivity, and high mechanical strength.

The plurality of pixel electrodes 16 arranged in a predetermined pattern (typically, arranged in matrix) and the scribe marks 50 are formed on the interlayer insulating film 15. Through holes 15a open to the TFT elements 14 are formed in the interlayer insulating film 15 so that the pixel electrodes 16 and the TFT elements 14 are connected electrically to each other through the through holes 15a. The scribe marks 50 in the present specification are alignment marks for aiding precise division.

In the liquid crystal display panel 1 in accordance with the present preferred embodiment, the film of the pixel electrodes 16 is the thinnest of all the conductive members of the electrode lines of the gate lines 12 and the source lines 13, the pixel electrodes 16, and the like. The scribe marks 50 are formed of the same film as a conductive oxide film, for example, an ITO film forming the pixel electrodes 16, which are the thinnest of all the conductive members.

Figure 4A:
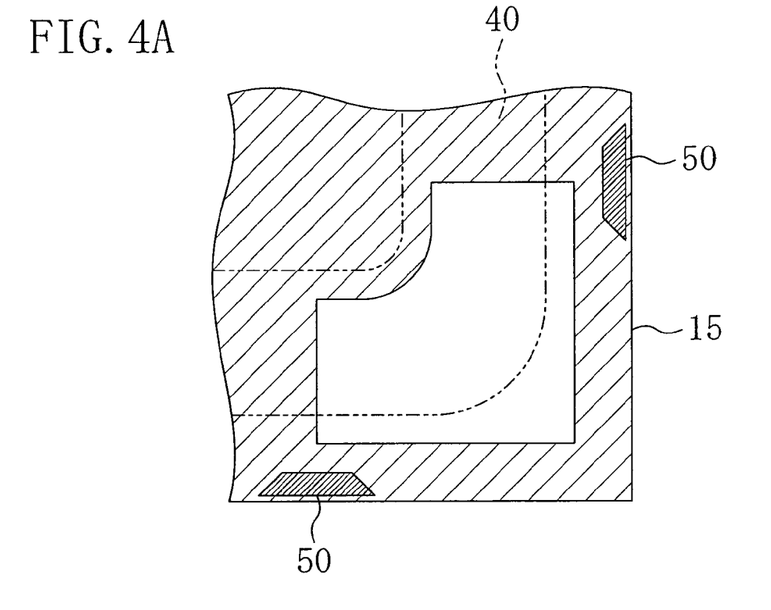
FIG. 4A is an enlarged plan view showing the portion encircled in IV in FIG. 1
Figure 4B:
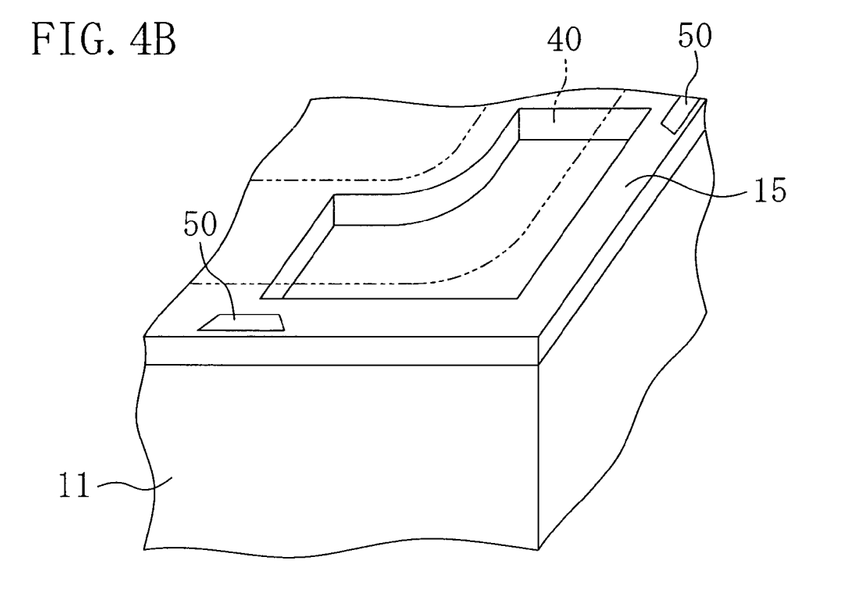
FIG. 4B is an enlarged perspective view thereof.

As shown in FIG. 4, the interlayer insulating film 15 separating and insulating the TFT elements 14 and the pixel electrodes 16 covers the entire surface of a portion on the liquid crystal layer 20 side of the first substrate body 11 which is located at the periphery of the liquid crystal display panel 1 with a portion of the first substrate body 11 exposed which is overlapped with a portion (a corner part, for example) of the sealant 40. The interlayer insulating film 15 functions also as a generally-called flattening film for flattening a portion of the surface on the liquid crystal layer 20 side of the first substrate body 11 which is located at the periphery of the liquid crystal display panel 1. Each portion of both the surfaces of the first substrate body 11 including the surface on the liquid crystal layer 20 side which is located at the periphery of the liquid crystal display panel 1 is formed so as to be flat and smooth.

The reason why a portion (a portion overlapped with a corner of the sealant 40, for example) of the first substrate body 11 is allowed to be exposed through the interlayer insulating film 15 is to increase the adhesiveness of the sealant 40, which is made of a material generally exhibiting excellent adhesiveness to inorganic materials, for example, a material of which main component is epoxy-based thermosetting resin, ultraviolet curing resin, or the like, to the active matrix substrate 40.

The counter substrate 30 includes: a second substrate body 31 made of glass, for example; a color filter layer 32; an upper common electrode 33; a second rubbing film (an alignment film) 34; and a second polarizing plate 35 provided on the surface on the opposite side of the liquid crystal layer 20 side of the second substrate body 31. The color filter layer 32 is formed on the second substrate body 31 and is composed of a plurality of types of filter layers different from each other in color tone for transmitting light and a black matrix layer dividing the filter layers. The upper common electrode 33 is formed on the color filter layer 32, and the second rubbing film 34 in contact with the liquid crystal layer 20 is formed on the upper common electrode 33. Each portion of the surfaces, including the surface on the liquid crystal layer 20 side, of the counter substrate 30 which is located at the periphery of the liquid crystal display panel 1 is formed so as to be flat and smooth.

A process for manufacturing the liquid crystal display panel 1 will be described next with reference to FIG. 5 to FIG. 12.

Figure 5:
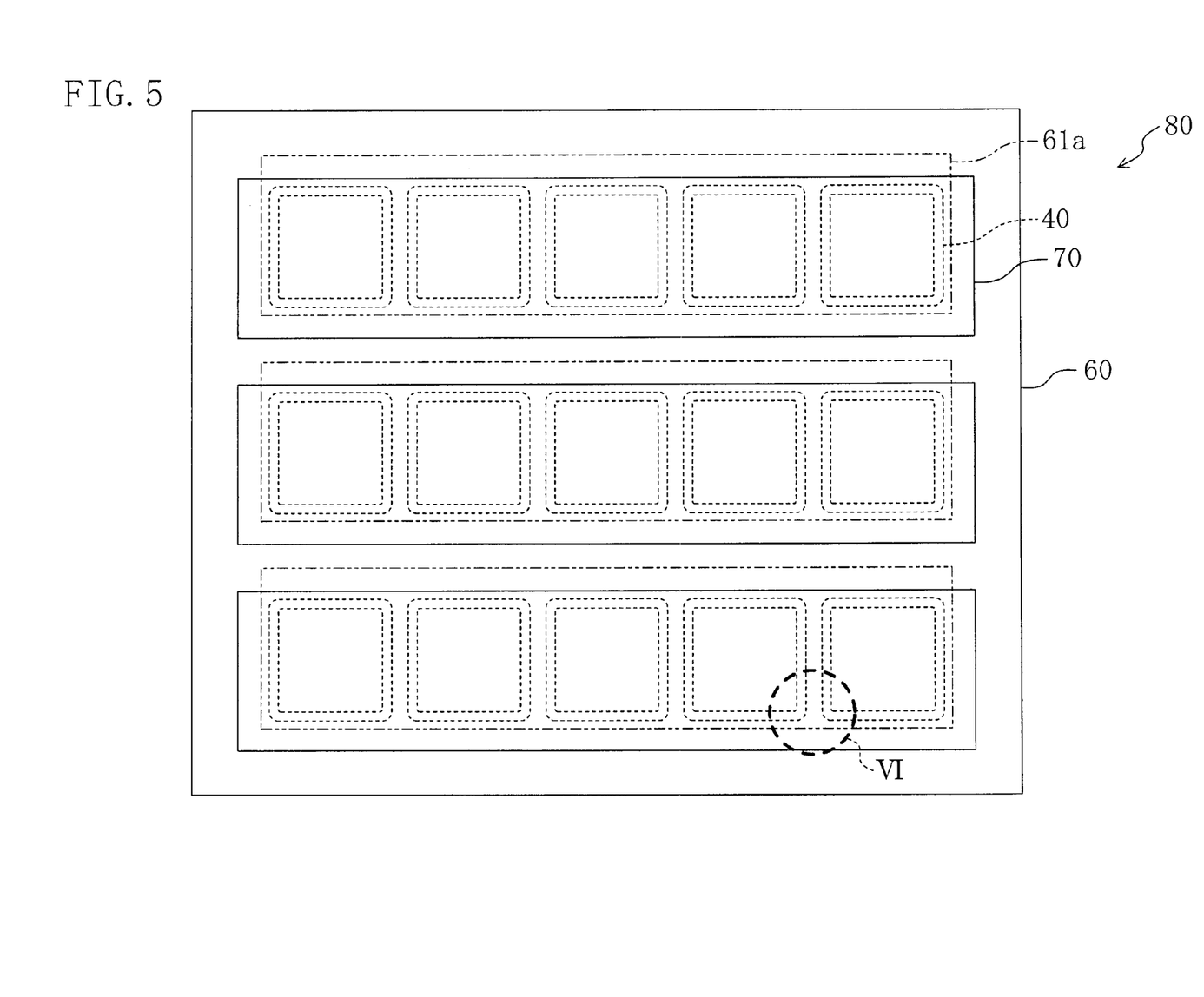
FIG. 5 is a plan view showing a step of manufacturing the liquid crystal display panel 1 in accordance with a preferred embodiment of the present invention.

First, as shown in FIG. 5, a first mother glass 60 as a base material of the active matrix substrate 10 is prepared. The first mother glass 60 is a large-size glass substrate from which a plurality of active matrix substrates 10 can be cut out (for example, about 120 active matrix substrates 10 arranged in matrix of 12 rows by 10 columns). On the first mother glass substrate 60, the gate lines 12, the source lines 13, the TFT elements 14, the pixel electrodes 16, the scribe marks 50, and the like are formed sequentially to form plural constitutional units of the active matrix substrates 10 connected to each other in series on the first mother glass 60 as the first substrate body 11.

In this active matrix substrate forming step, the scribe marks 50 are preferably formed with the use of the same film as the film forming the pixel electrodes 16 simultaneously with the formation of the pixel electrodes 16.

In parallel to the above step, a second mother glass 70 as a base material of the counter substrate 30 is prepared. The second mother glass 70 is a middle-size glass substrate smaller than the first mother glass substrate 60, from which a plurality of counter substrates 30 can be cut out (for example, about 10 counter substrates 30 arranged in one direction). On the second mother glass substrate 70, the color filter layer 32, the upper common electrode 33, the second rubbing film 34, and the like are formed sequentially to form plural constitutional units of the counter substrates 30 arranged in one direction simultaneously.

Thereafter, a plurality of annular sealants 40 each having an opening (a liquid crystal injection port) are formed on the first mother glass 60 by, for example, screen printing. Then, the second mother glass substrate 70 is arranged on and joined to the sealants 40 to thus manufacture a substrate structure (joined substrate) 80 in which plural constitutional units are formed in a predetermined pattern (typically in matrix), as shown in FIG. 5.

Figure 6:
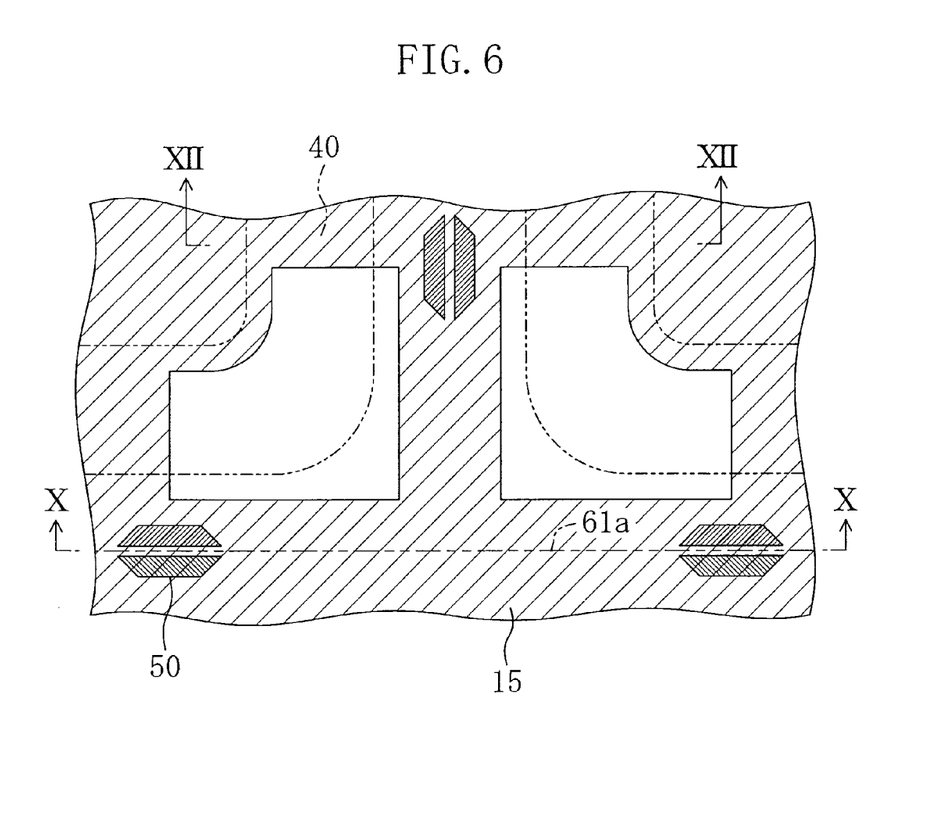
FIG. 6 is an enlarged plan view showing an arrangement in a portion encircled in VI in FIG. 5.

Next, the substrate structure 80 is cut to form a strip-shaped substrate structure 81 in which a plurality of constitutional units are arranged in one direction (hereinafter this step may be referred to as a "first dividing step"). Specifically, first scribe lines (linear cracks) 61a are formed in each of the active matrix substrate 10 and the counter substrate 30 preferably by a cutter wheel with the use of the pairs of scribe marks 50 opposed to each other as guides so as to pass through the centers of the slits between pairs of scribe marks 50, as shown in FIG. 5 and FIG. 6. Then, the substrate is divided along the first scribe lines 61a to form the strip-shaped substrate structure 81.

Figure 7:
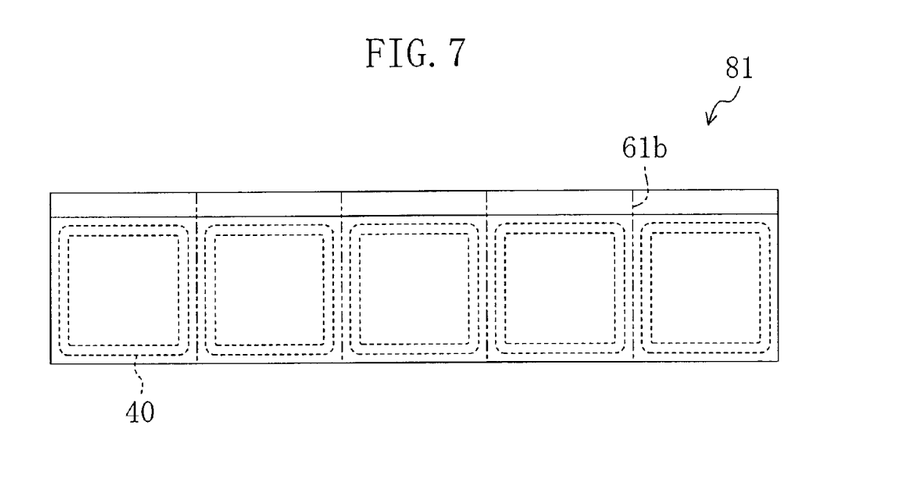
FIG. 7 is a plan view showing a step of manufacturing the liquid crystal display panel in accordance with a preferred embodiment of the present invention.

In general, in order to simplify the manufacturing process, the liquid crystal layers 20 are formed by injecting liquid crystal to a plurality of vacant cells arranged in a strip. After formation of the liquid crystal layers 20, the plural constitutional units arranged in a strip are divided individually to complete a plurality of liquid crystal display panels 1 (hereinafter this step may be referred to as a "second dividing step"). Specifically, second scribe lines 61b for dividing the plural constitutional units arranged in a strip are formed in each of the active matrix substrate 10 and the counter substrate 30 so as to pass through the centers of the slits between the pairs of scribe marks 50 opposed to each other. Hereinafter, the first scribe lines 61a and the second scribe lines 61b may be called scribe lines 61 collectively. Then, the substrates are divided along the second scribe lines 61b to thus complete the liquid crystal display panels 1. Conventionally, breakage and chipping occur in the active matrix substrate 10 and the counter substrate 30 with high frequency in the first and second dividing steps.

Figure 8:
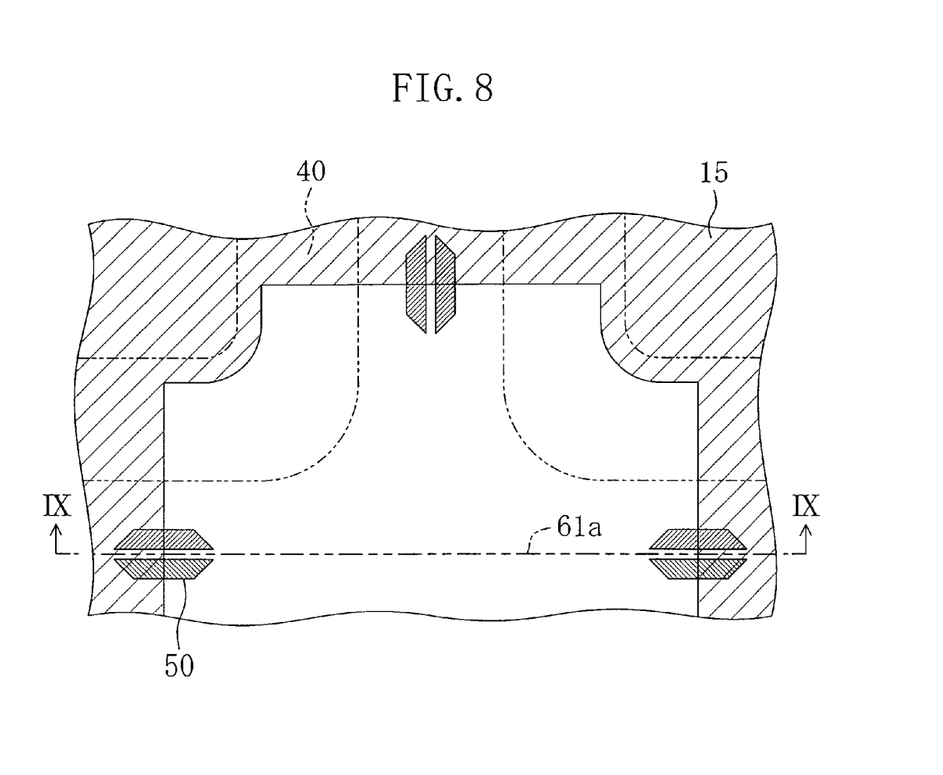
FIG. 8 is a partial plan view of a conventional substrate structure.
Figure 9:
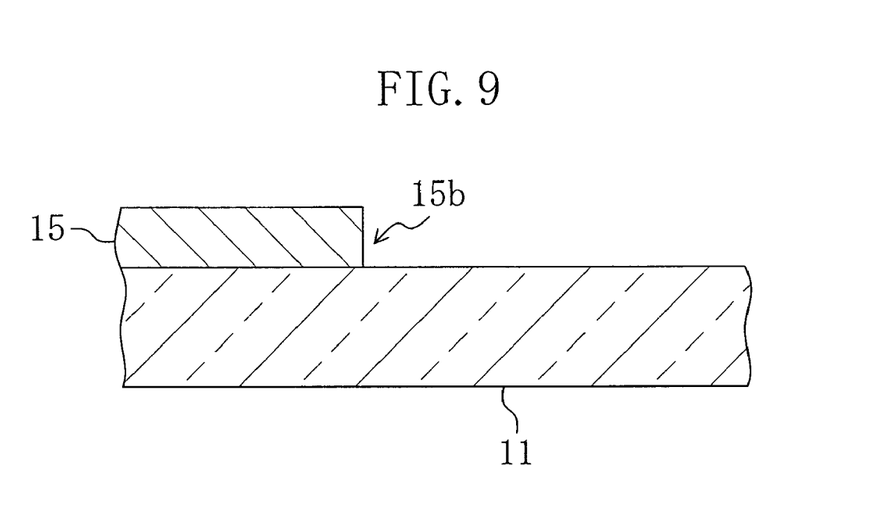
FIG. 9 is a schematic sectional view of a portion taken along the line IX-IX in FIG. 8.

As described above, the sealant 40 exhibits high adhesiveness to inorganic members when compared with that to organic members, and accordingly, the active matrix substrate 10 and the counter substrate 30 adhere to each other strongly. On this basis, it is preferable to expose a portion of the first substrate body 11 to a portion (a corner, for example) of the sealant 40 without forming the interlayer insulating film 15 in the vicinity of the corners of the liquid crystal display panel, as shown in FIG. 8. If so, there are formed in the scribe lines 61 a portion where the interlayer insulating film 15 is formed and a portion where the interlayer insulating film 15 is not formed. Accordingly, as shown in FIG. 9, a step 15b is formed at the boundary between the portion where the interlayer insulating film 15 is formed and the portion where the interlayer insulating film 15 is not formed.

The scribe lines 61 are formed across the step 15b, which causes comparatively large stress at the step 15b, thereby increasing the possibility of forming undesirable cracks and chips in the vicinity of the step 15b which may cause breakage and chipping of the active matrix substrate 10 and the counter substrate 30. For this reason, it is difficult to manufacture a liquid crystal display panel from the conventional substrate structure 80 at high production efficiency.

In contrast, in the present preferred embodiment, no step is formed in the scribe lines 61 and the scribe lines 61 are flat to lower the possibility of causing breakage and chipping of the active matrix substrate 10 and the counter substrate 30.

Figure 10:
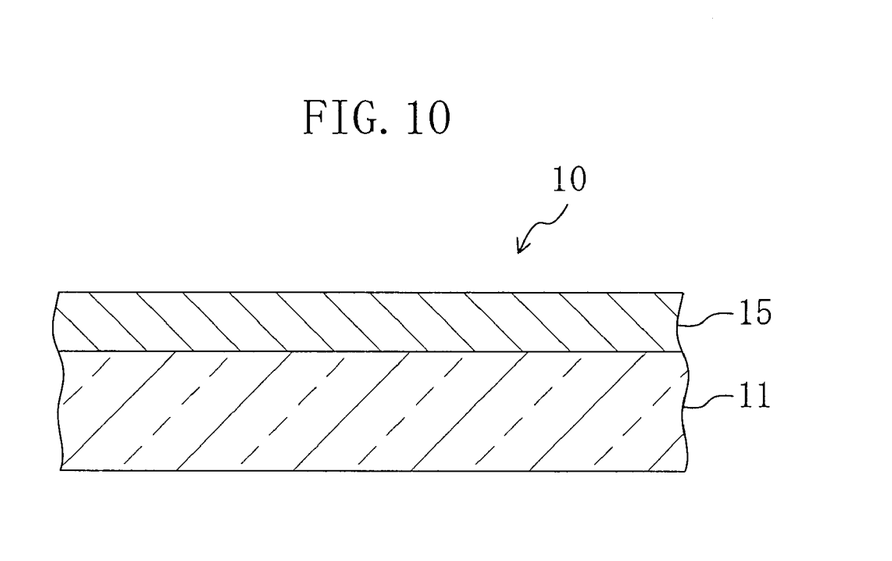
FIG. 10 is a schematic sectional view of a portion taken along the line X-X in FIG. 6.

In the present preferred embodiment, as shown in FIG. 6, a portion of the first substrate body 11 (a portion overlapped with the corner of the sealant 40, for example) is exposed to the sealant 40 through the interlayer insulating film 15, and the interlayer insulating film 15 covers a region where the scribe lines 61 is to be formed. Accordingly, as shown in FIG. 10, the vicinity of the scribe lines 60 on the surface on the liquid crystal layer 20 side of the first mother glass substrate 60 is flat. In detail, the interlayer insulating film 15 covers the periphery of the surface on the liquid crystal layer 20 side of the first substrate body 11 of the divided liquid crystal display panel 1, and therefore, the periphery of the surface on the liquid crystal layer 20 side of the first substrate body 11 is flat. Hence, in the present preferred embodiment, undesirable cracks are effectively prevented from being formed in the surface on the liquid crystal layer 20 side of the active matrix substrate 10 in forming the scribe lines 61 in the first mother glass substrate 60 in the first and second dividing steps. This enables the liquid crystal display panel 1 to be manufactured with high production efficiency.

Preferably, the flattening film for flattening the vicinity of the scribe lines 60 in the surface on the liquid crystal layer 20 side of the first mother glass substrate 60 is made of resin (more preferably, organic resin) as in the present preferred embodiment. By covering the scribe lines 61 with resin, undesirable cracks are prevented effectively from being formed in the scribing step.

In the present preferred embodiment, a portion of the surface on the liquid crystal layer 20 side of the counter substrate 30 which is located at the periphery of the divided liquid crystal display panel 1 is flat, as well. Specifically, the vicinity of the scribe lines 61 in the surface on the liquid crystal layer 20 side of the second mother glass substrate 70 is flat. Accordingly, in the present preferred embodiment, undesirable cracks are effectively prevented from being formed in the surface on the liquid crystal layer 20 side of the counter substrate 30 in forming the scribe lines 61 in the second mother glass substrate 70 in the first and second dividing steps. This enables the liquid crystal display panel 1 to be manufactured with high production efficiency.

The scribe marks 50 in the present preferred embodiment will be described further in detail.

In the present preferred embodiment, the scribe marks 50 are not formed across the scribe lines 61 but are formed so as to be opposed to each other with the scribe lines 61 interposed. In other words, the scribe marks 50 are formed apart from the edge of the active matrix substrate 10 of the divided liquid crystal display panel 1. For example, in the case where the scribe marks 50 are formed across the scribe lines 61, undesirable cracks might be formed in the scribing step in the vicinity of portions where scribe marks 50 are formed, which is due to the difference in material characteristics (hardness and the like, for example) between the scribe marks 50 and the first mother glass substrate 60. In contrast, in the present preferred embodiment, the scribe marks 50 are not formed across the scribe lines 61 to suppress formation of undesirable cracks. Hence, the liquid crystal display panel 1 can be manufactured with high production efficiency.

Further, in the present preferred embodiment, the scribe marks 50 are preferably formed of the same film as the film of the pixel electrodes 16 which is the thinnest of all the conductive members of the electrode lines (the gate lines 12, the source lines 13, and the like), the pixel electrodes 16, and the like. In other words, the scribe marks 50 are formed comparatively thinly in the present preferred embodiment. This effectively suppresses breakage and chipping of the counter substrate 30.

Figure 11:
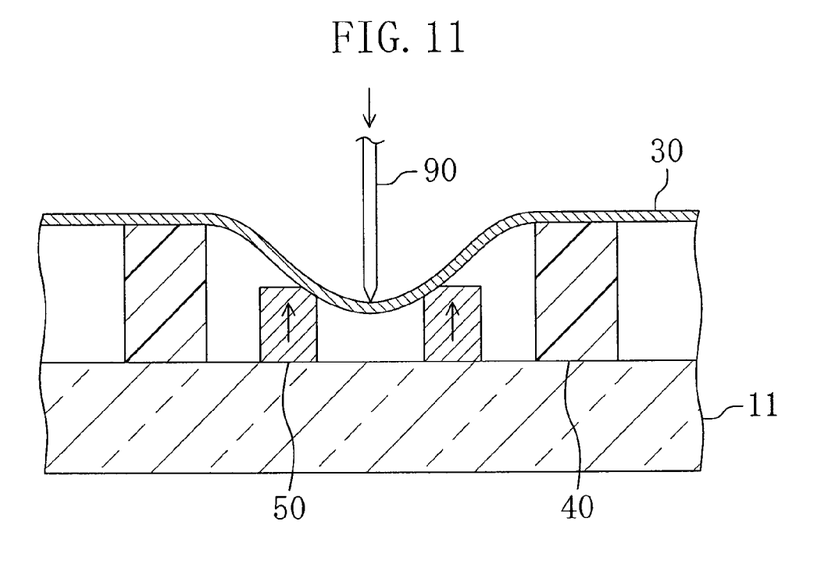
FIG. 11 is a schematic sectional view for explaining a scribing step in the case where a thick scribe mark is formed.

For forming the scribe marks 50 in the counter substrate 30, the cutter wheel 80 presses and scans the counter substrate 30. The counter substrate 30, which is comparatively thinner than the active matrix substrate 10, is deformed convexly toward the active matrix substrate 10 by the pressure from the cutter wheel 80. In the case where the opposed scribe marks 50 interposing the scribe lines 61 are comparatively thick, the thus deformed counter substrate 30 may be in contact with the scribe marks 50, as shown in FIG. 11. When the counter substrate 30 is in contact with the scribe marks 50, the counter substrate 30 is pressed by three members of the pair of scribe marks 50 and the cutter wheel 80, thereby increasing the possibility of causing breakage and chipping of the counter substrate 30. This might lower the production efficiency.

Figure 12:
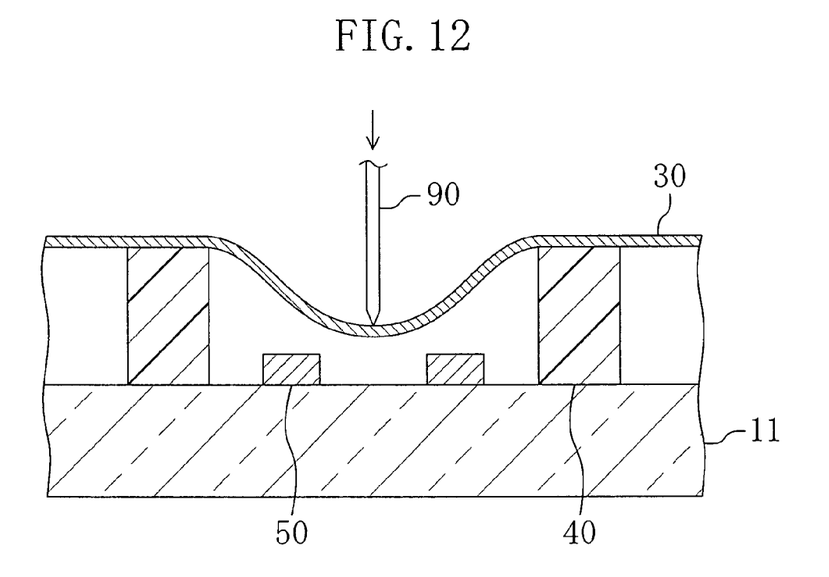
FIG. 12 is a schematic sectional view of a portion taken along the line XII-XII in FIG. 6 for showing a scribing step in a preferred embodiment of the present invention.

In contrast, in the present preferred embodiment, the scribe marks 50 is formed comparatively thinly to suppress contact of the counter substrate 30 to the scribe marks 50, as shown in FIG. 12. Accordingly, formation of undesirable cracks and the like in the counter substrate 30 is suppressed, thereby enabling manufacture of the liquid crystal display panel 1 with high production efficiency. In view of this, it is preferable that the scribe marks 50 on the active matrix substrate 10 are thin enough not to be in contact with the counter substrate 30 in the scribing step.

Though the scribe marks 50 are preferably formed of the same film as the conductive oxide film forming the pixel electrodes 16 in the present preferred embodiment, the present invention is not limited thereto and the scribe marks 50 may be substantially formed of a metal material, for example. To do so, the scribe marks 50 may be formed of the same film as a film forming the electrode lines of the gate lines 12 or the source lines 13, for example. The scribe marks 50 made of a metal material is excellent in visibility, and therefore, more precise division can be achieved.

Modified Example 1

Modified Example of the First Preferred Embodiment

Figure 13:
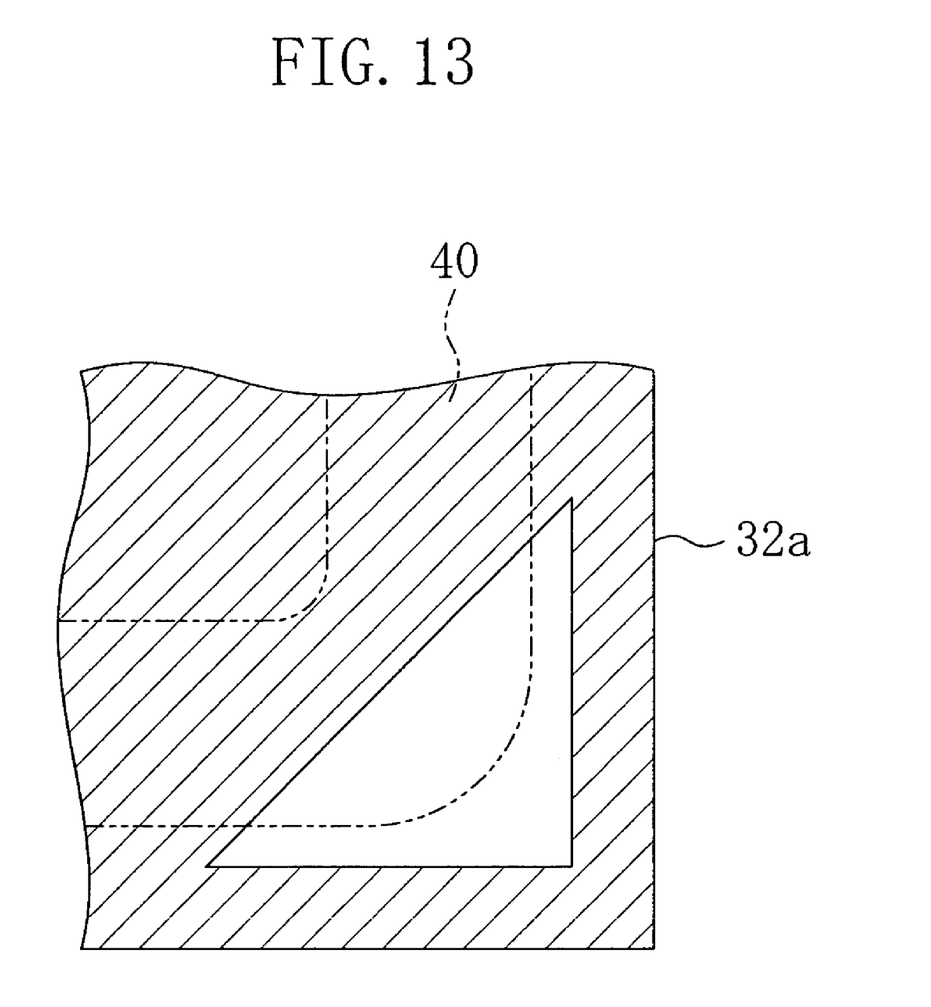
FIG. 13 is a partial plan view of a liquid crystal display panel in accordance with Modified Example 1.

FIG. 13 shows a liquid crystal display panel in accordance with Modified Example 1.

As shown in FIG. 13, the surface on the liquid crystal layer 20 side of the second substrate body may be flattened in such a manner that a black matrix layer 32a included in the color filter layer 32 is formed so as to cover a portion of the surface on the liquid crystal layer 20 side thereof which is located at the periphery of the liquid crystal display panel. In other words, the black matrix layer 32a may cover a portion of the second mother glass substrate 70 where the scribe lines 61 are formed.

Modified Example 2

Modified Example of First Preferred Embodiment

Figure 14:
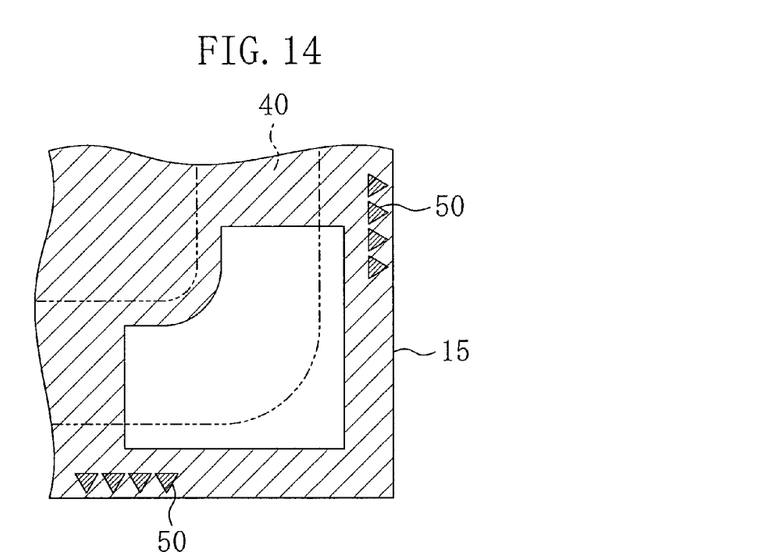
FIG. 14 is a schematic plan view showing in an enlarged scale a portion of a liquid crystal display panel in accordance with Modified Example 2.
Figure 15:
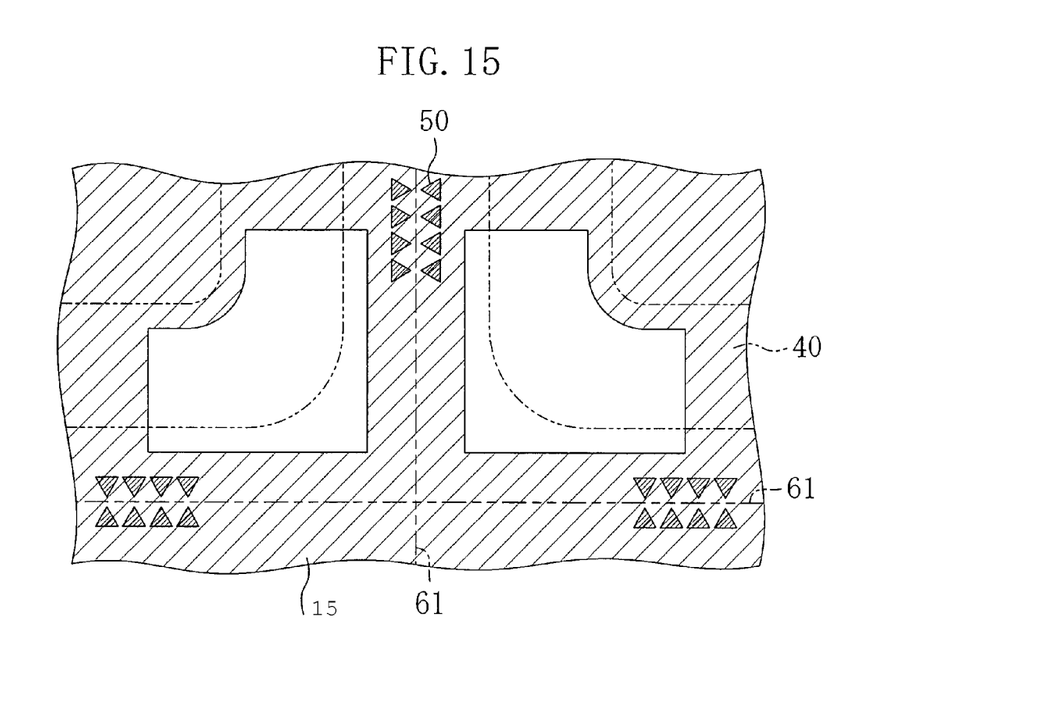
FIG. 15 is a plan view showing a step of manufacturing the liquid crystal display panel in accordance with Modified Example 2.

FIG. 14 shows a liquid crystal display panel in accordance with Modified Example 2. FIG. 15 shows a manufacturing step thereof.

As shown in FIG. 14 and FIG. 15, each scribe mark 50 may be a set of marks having a substantially triangular shape (e.g., equilateral triangle) in plan view.

Second Preferred Embodiment

Figure 16:
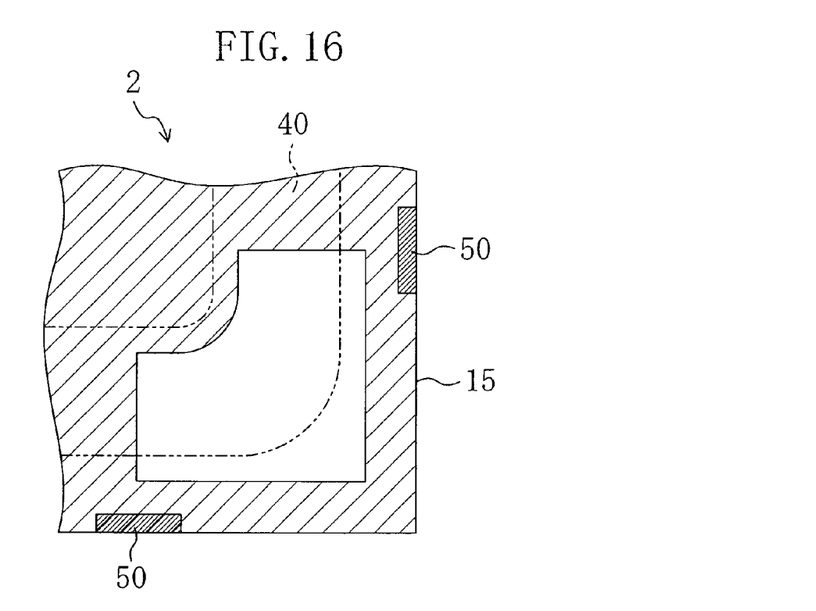
FIG. 16 is a schematic plan view showing an arrangement in a liquid crystal display panel in accordance with a preferred embodiment of the present invention.
Figure 17:
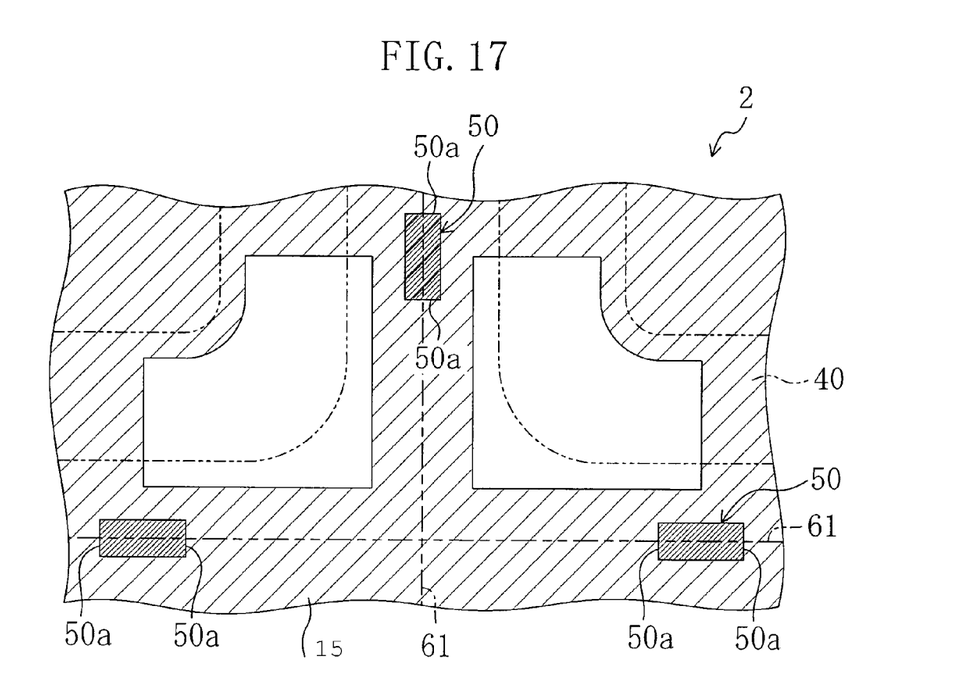
FIG. 17 is a plan view showing a step of manufacturing the liquid crystal display panel in accordance with a preferred embodiment of the present invention.

FIG. 16 shows a liquid crystal display panel 2 in accordance with a second preferred embodiment. FIG. 17 shows a manufacturing step thereof.

The liquid crystal display panel 2 in accordance with the second preferred embodiment preferably has the same features as the liquid crystal display panel 1 in accordance with the first preferred embodiment except for the arrangement of the scribe marks 50. Hereinafter, only the arrangement of the scribe marks 50 in the second preferred embodiment will be described in detail. In the description of the second preferred embodiment, the reference numerals common to those of the first preferred embodiment are assigned to elements having substantially the same functions for omitting detailed description.

In the liquid crystal display panel 2 in accordance with the second preferred embodiment, the scribe marks 50 are preferably formed to have a substantially rectangular shape in plan view of which one of the sides thereof is aligned with an edge of the active matrix substrate 10 in plan view. In other words, as shown in FIG. 17, the scribe marks 50 having a substantially rectangular shape in plan view are formed across the scribe lines 61. In this case, the scribe marks 50 may be made of a metal material but preferably is made of conductive oxide (the same film as the film of the pixel electrodes 16, for example). Scribing of the scribe marks 50 made of a metal material, which is largely different in material characteristics from the glass-made first substrate body 11, readily forms undesirable cracks or the like in the vicinity of the scribe marks 50. In contrast, the scribe mark made of conductive oxide comparatively similar in material characteristics to glass, such as indium tin oxide, indium zinc oxide, or the like effectively suppresses formation of cracks and the like in the vicinity of the scribe marks 50. Hence, the liquid crystal display panel 2 capable of being manufactured with high production efficiency can be attained.

In the second preferred embodiment, sides 50a of the scribe marks 50 are intersected at a right angle with the edge of the active matrix substrate 10 (scribe lines 61). This effectively suppresses formation of cracks and the like in the vicinity of the scribe marks 50 when compared with the case, for example, where the sides 50a of the scribe marks 50 are inclined with respect to the scribe lines 61.

It is noted that the scribe marks 50 referred to in the first and second preferred embodiments and Modified Examples 1 and 2 are mere examples and are not limiting of the present invention in any respect.

Hereinbefore, the preferred embodiments of the display panel in accordance with the present invention have been described by referring to the active matrix liquid crystal display panels in first and second preferred embodiments and Modified Examples 1 and 2, but the display panel in accordance with the present invention is not limited to the active matrix display panels. For example, the display panel may be a passive matrix display panel or a segment display panel. Further, the flattening film is not limited to the interlayer insulating film 15 and may be another film. For example, a metal reflective film (see, Japanese Unexamined Patent Application Publication No. 11-242215 and the like, for example) or a color filter flattening film (see, Japanese Unexamined Patent Application Publication No. 4-60517 and the like, for example) may be used in the case of a passive matrix display panel.

Moreover, the display panel in accordance with the present invention is not limited to the liquid crystal display panel and may be any kind of display panels, such as an inorganic electroluminescent display panel, an organic electroluminescent display panel, a field emission display panel, a plasma display panel, and the like. In addition, the present invention is applicable to various kinds of general electronic components.

As described above, the display panel in accordance with various preferred embodiments of the present invention can be manufactured with high production efficiency and is, therefore, useful for mobile appliances, such as mobile phones, PDAs, and the like, televisions, electronic books, monitors, electronic posters, watches, electronic shelf labels, emergency signs, and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A display panel comprising:
a first substrate;
a second substrate opposed to the first substrate;
a display medium layer provided between the first substrate and the second substrate;
a sealant surrounding the display medium layer between the first substrate and the second substrate so as to join the first substrate and the second substrate and sealing the display medium layer; wherein
the first substrate includes a mark located at a periphery of the display panel outside of the sealant and arranged on a side of the display medium layer, and a flattening film which is arranged on the side of the display medium layer to cover a surface of the first substrate;

the flattening film includes a sealing exposing portion arranged around the display panel so as to expose the sealant to an outside; and the mark is arranged on a portion between the sealing exposed opening and an edge side of the flattening film.

2. The display panel of claim 1, wherein the first substrate further includes a plurality of thin film transistors located on the first substrate, an interlayer insulating film which is located on the plurality of thin film transistors and in which a plurality of through holes open to the plurality of thin film transistors are formed, and a plurality of pixel electrodes which are located on the interlayer insulating film and which are electrically connected to the thin film transistors through the plurality of through holes, and the interlayer insulating film defines the flattening film on the entirety of the portion of the first substrate which is located at the periphery of the display panel.

3. The display panel of claim 1, wherein the flattening film is a resin film.

4. The display panel of claim 1, wherein the display medium layer is a liquid crystal layer.

5. The display panel of claim 1, wherein the first substrate includes a plurality of conductive members; and the mark is defined by a thinnest one of the plurality of conductive members.

6. The display panel of claim 5, wherein the first substrate includes a plurality of gate lines extending in parallel or substantially in parallel to one another, a plurality of source lines extending in parallel or substantially in parallel to one another to define angles with respect to a direction in which the plurality of gate lines extend, a plurality of switching elements each connected to both a corresponding one of the plurality of gate lines and a corresponding one of the plurality of source lines, an interlayer insulating film provided on the switching elements and including a plurality of through holes that are each open to a corresponding one of the switching elements, and a plurality of pixel electrodes that are each electrically connected to a corresponding one of the switching elements through the interlayer insulating film; and the plurality of conductive members include the plurality of gate lines, the plurality of source lines, and the plurality of pixel electrodes.

7. The display panel of claim 6, wherein the mark is substantially made of a transparent conductive oxide.

8. The display panel of claim 7, wherein the plurality of pixel electrodes are substantially made of the transparent conductive oxide; and the mark is made of a same material as that of the plurality of pixel electrodes.

9. The display panel of claim 1, wherein the mark is substantially made of a metal material.

10. The display panel of claim 9, wherein the first substrate includes electrode lines substantially made of a metal material; and the mark is made of a same material as that of the electrode lines.

11. The display panel of claim 1, wherein the mark is spaced from an edge of the first substrate.

12. The display panel of claim 1, wherein the mark has a polygonal shape in plan view including a side corresponding to an edge of the first substrate in plan view.

13. The display panel of claim 12, wherein the mark includes at least one edge in perpendicular or substantially perpendicular contact with an edge of the first substrate in plan view.

14. The display panel of claim 1, wherein the mark is a scribe mark.

* * * * *